(12) United States Patent
Mattox

(10) Patent No.: US 6,866,048 B2
(45) Date of Patent: Mar. 15, 2005

(54) METHOD TO DECREASE IRON SULFIDE DEPOSITS IN PIPE LINES

(76) Inventor: Mark Andrew Mattox, 507 N. Cedar St., Foley, AL (US) 36535

( * ) Notice: Subject to any disclaimer, the term of this patent is extended or adjusted under 35 U.S.C. 154(b) by 0 days.

(21) Appl. No.: 10/044,767

(22) Filed: Jan. 10, 2002

(65) Prior Publication Data

US 2003/0133827 A1 Jul. 17, 2003

Related U.S. Application Data

(60) Provisional application No. 60/312,647, filed on Aug. 15, 2001.

(51) Int. Cl.$^7$ .............................................. B08B 9/027
(52) U.S. Cl. ............................... 134/22.11; 134/22.13; 134/22.14; 134/22.16
(58) Field of Search ......................... 134/22.1, 2, 22.11, 134/22.12, 22.13, 22.19, 22.14, 34, 36, 42, 22.16, 22.17, 22.18; 252/79.5, 79.1; 510/467, 363

(56) References Cited

U.S. PATENT DOCUMENTS

| | | | |
|---|---|---|---|
| 3,947,276 A | | 3/1976 | Siclari et al. |
| 4,078,101 A | | 3/1978 | Cole |
| 4,370,236 A | * | 1/1983 | Ferguson ..................... 210/634 |
| 5,753,180 A | * | 5/1998 | Burger .......................... 422/7 |
| 6,063,290 A | * | 5/2000 | Failon et al. ................ 210/699 |
| 6,153,100 A | * | 11/2000 | Mitchell ...................... 210/634 |
| 6,517,617 B1 | * | 2/2003 | Chartier et al. ........... 106/14.42 |
| 2003/0226808 A1 | * | 12/2003 | Fidoe et al. ................ 210/699 |

FOREIGN PATENT DOCUMENTS

| | | | |
|---|---|---|---|
| WO | Wo00/21892 | * | 4/2000 |
| WO | Wo02/08127 A1 | * | 1/2002 |
| WO | Wo0208127 | * | 1/2002 |

OTHER PUBLICATIONS

Gilbert et al, Corrosion, 2002, paper No. 02030, NACE international, 2002.*

Larsen, Jan; Sanders, Peter F.; Talbot, Robert E.; "Experience with the Use of Tetrakishydroxymethylphosphonium Sulfate (THPS) for the Control of Downhole Hydrogen Sulfide," *Corrosion 2000* (2000) pp. 1–18.

Nasr–El–Din, H.A.; Al–Humaidan, A.Y.; Mohamed, S.K.; Al–Salman, A.M.; Aramco, Saudi; "Iron Sulfide Formation in Water Supply Wells with Gas Lift," *Society of Petroleum Engineers*; Presentation for the Society International Symposium on Oilfied Chemistry held in Houston, Texas, Feb. 13–16, 2001; SPE 65028 pp. 1–16.

Haack, T.; Diaz, R.; Talbot, Dr. R.E.: "TetrakisHydroxymethyl Phosphonium Sulfate (THPS): A New Oilfield Bactericide Providing Iron Sulfide Dissolution and Environmental Benefits", presented at Exitep 98, Mexico City, Nov. 15–16, 1998.

Albright & Wilson: *U.K. Corrosion '98*; "The Use of Chemical Biocides to Control Downhole Bacteria" (A Review of Experience with THPS); Presentation delivered at the UK Corrosion '98 Conference in Sheffield, UK, organized by NACE.

*Corrosion 2000* (Mar. 26–31, 2000, Orlando, Florida), "Experience with Use of TetrakisHydroxymethylPhosphonium Sulfate (THPS) for the Control of Downhole Hydrogen Sulfide."

* cited by examiner

Primary Examiner—Alexander Markoff
(74) Attorney, Agent, or Firm—Foley & Lardner LLP

(57) ABSTRACT

This invention provides a method of treating a dry or processed fluid pipe line susceptible to the build-up of iron sulfide deposits by complexing the iron sulfide in the pipe lines. The method of the present invention introduces the composition on a continuous or a batch basis to a gas pipe line. The composition is made of a solution of 1) water, 2) [tetrakis(hydroxymethyl)phosphonium]sulfate or chloride, and 3) a soluble ammonium salt, such as ammonium chloride or the like.

12 Claims, No Drawings

METHOD TO DECREASE IRON SULFIDE DEPOSITS IN PIPE LINES

RELATED APPLICATIONS

This application claims priority under 35 U.S.C. Sec. 119(e) based on Ser. No. 60/312,647 filed Aug. 15, 2001 (hereby incorporated by reference in its entirety).

STATEMENT REGARDING FEDERALLY SPONSORED RESEARCH OR DEVELOPMENT

NOT APPLICABLE

1. Field of the Invention

This invention relates to a method to remove iron sulfide deposits from gas and fluid pipe lines.

2 Background of the Invention

Iron sulfide complexed with hydrocarbons is a significant problem for the oil and gas industry. Presently, the hydrocarbons are solubilized with inorganic solvents and the pipe lines are cleaned mechanically. See Plummer, U.S. Pat. No. 5,334,363; Bedelletal, U.S. Pat. No. 6,063,346; Warrender, U.S. Pat. No. 6,267,938; Fisher, U.S. Pat. No. , 6,136,282. A byproduct of this mechanical cleaning is a sludge that can be flammable and must be disposed of in a landfill.

A need exists in the industry to reduce iron sulfide/hydrocarbon deposits and reduce waste products. Additionally, a need exists in the industry to reduce the necessity for physical cleaning of the pipelines so that an accurate determinate of the structure integrity of the pipe line can be assessed through instrumentation such as SMART PIGS.

SUMMARY OF THE INVENTION

This invention relates to a method of treating dry gas pipe or processed fluid pipe lines that are susceptible to the build up of iron sulfide deposits, by complexing iron sulfide found in these pipe lines. This method involves adding to the dry gas pipe line a composition made of: water, [tetrakis(hydroxymethyl)phosphonium]sulfate or chloride and a soluble ammonium salt, the compound being added in a quantity at least sufficient to complex the iron sulfide in the dry pipe lines.

According to another aspect of this invention, a method of treating processed fluid pipe lines susceptible to the build up of iron sulfide deposits to complex iron sulfide found in pipe lines is provided. This method involves adding to the processed fluid pipe line a composition made of water, [tetrakis(hydroxymethyl)phosphonium]sulfate or chloride and a soluble ammonium salt, the compound being added in a quantity at least sufficient to complex the iron sulfide in the processed fluid pipe lines.

DETAILED DESCRIPTION OF THE INVENTION

The method of the present invention introduces a composition into an oil or gas pipe line. The composition is comprised of a solution of 1) water, 2) [tetrakis(hydroxymethyl)phosphonium]sulfate or chloride, and 3) a soluble ammonium salt, such as ammonium chloride or the like. This composition reacts with and complexes soluble and insoluble iron (II) compounds by as series of chemical reactions at ambient temperature resulting in the solublization of the iron (II) compounds. The extent of complexation and time for dissolution depends on the amount of the composition in relation to the amount of the iron (II) substances with which it is reacted, temperature, ratio and amount of ammonium ion and tetrakis(hydroxymethyl)phosphonium]sulfate, and degree of agitation. For example, at ambient temperature, 1 gallon of the composition, which is a mixture of 5% (by weight) of [tetrakis(hydroxymethyl)phosphonium]sulfate and 0.5% (by weight) ammonium chloride in water, will dissolve at least 23.6 grams of iron (II) sulfide suspended as a solid in an aqueous mixture or the same amount of the solid. With moderate agitation, the time for complete dissolution is about 10 hours.

Once the composition is introduced into the pipe line, the line is physically cleaned by pigging. Pigging involves cleaning a pipe line (dry gas or processed fluids) with mechanically induced friction that varies depending on the construction of the pipe. With the application of the present invention, the necessity to pig is reduced. The composition is fed into the pipeline on a continuous or batch basis to reduce the need for mechanical cleaning.

EXAMPLE 1

Batch and Pig Procedure

The composition of the present invention is batched into the pipeline and is injected by gravity feed or injection depending on pressure. A pig is then launched following the batch treatment of the composition to move the composition down the line. For best results, the pig should be moved at six miles per hour, but due to uncontrollable condition is not necessary. Samples should be taken at the pig receiver to evaluate if additional pigging is necessary. All volumes of composition used are based on length, inside diameter of the pipe, and the severity of dust, slug, or buildup in the pipeline. The pig type will be chosen based on the severity of the buildup in the line.

EXAMPLE 2

Pig Pill Batch Procedure

A pig is launched into the line and set at a known location in the pipeline. Composition is injected into the line. A second pig is launched forming a column of fluid between the two pigs that will cover the entire circumference of the pipeline wall. The pig pill is launched moving at six miles per hour depending on the control of pressure used to move the pigs. A third pig is optional with a carrier fluid for additional cleanup or any loose particulate left behind. Samples should be taken at the pig receiver to evaluate if additional pigging is necessary.

EXAMPLE 3

Non-Pigging Procedure

This procedure may be necessary due to the severity of buildup in the pipeline or the pipelines are not equipped with pig receivers and launchers. Some type of separation or holding vessels may be necessary up the line. Inject composition into the pipeline on continues bases upstream of the problem. Monitor flow rate and pressure and sample when possible Although the present invention has been described and illustrated with respect to preferred embodiments and a preferred use thereof, it is not to be so limited since modifications and changes can be made therein which are within the full scope of the invention.

I claim:

1. A method of cleaning a dry gas pipe line susceptible to the build up of iron sulfide deposits by complexing iron sulfide found in said dry gas pipe lines, the method comprising:

(a) adding to said dry gas pipe line a composition obtained by combining the constituents consisting essentially of: water, 5% (w/w) (tetrakis(hydroxymethyl) phosphonium)sulfate, and 0.5% (w/w) of a soluble ammonium salt, and (b) complexing said iron sulfide with said composition in said dry gas pipeline.

2. The method of claim 1 wherein said composition is added continuously to said dry gas pipe line.

3. The method of claim 1 wherein said composition is added intermittently to said dry gas pipe line.

4. A method of cleaning a dry gas pipe line of iron sulfide deposits by complexing iron sulfide found in said dry gas pipe lines, the method comprising:

(a) adding to said dry gas pipeline a composition obtained by combining the constituents consisting essentially of: water, 5% (w/w) (tetrakis(hydroxymethyl) phosphonium)chloride, and 0.5% (w/w) of a soluble ammonium salt, and (b) complexing said iron sulfide with said composition in said dry gas pipeline.

5. The method of claim 4 wherein said composition is added continuously to said dry gas pipe line.

6. The method of claim 4 wherein said composition is added intermittently to said dry gas pipe line.

7. A method of cleaning an oil pipe line of iron sulfide deposits by complexing iron sulfide found in said oil pipe line, the method comprising:

(a) adding to said oil pipe line a composition obtained by combining the constituents consisting essentially of: water, 5% (w/w) (tetrakis(hydroxymethyl) phosphonium)sulfate and 0.5% (w/w) of a soluble ammonium salt, and (b) complexing said iron sulfide with said composition in said oil pipeline.

8. The method of claim 7 wherein said composition is added continuously to said oil pipe line.

9. The method of claim 7 wherein said composition is added intermittently to said oil pipe line.

10. A method of cleaning an oil pipe line of iron sulfide deposits by complexing iron sulfide found in said oil pipe line, the method comprising:

(a) adding to said oil pipeline a composition obtained by combining the constituents consisting essentially of: water, 5% (w/w) (tetrakis(hydroxymethyl) phosphonium)chloride and 0.5% (w/w) of a soluble ammonium salt, and (b) complexing said iron sulfide with said composition in said oil pipeline.

11. The method of claim 10 wherein said composition is added continuously to said oil pipe line.

12. The method of claim 10 wherein said composition is added intermittently to said oil pipe line.

* * * * *